July 19, 1955     E. GLASER     2,713,489
FALLING MAN CHAIN AMUSEMENT DEVICE
Filed May 17, 1954     3 Sheets-Sheet 1
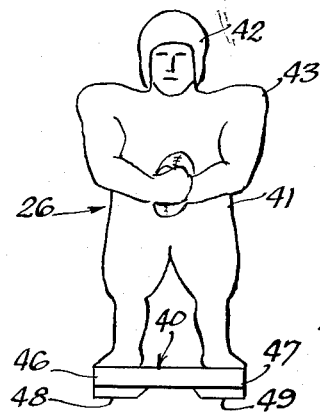
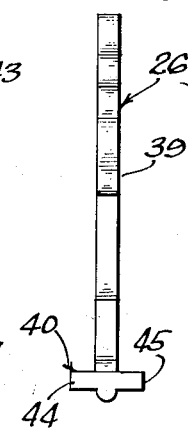
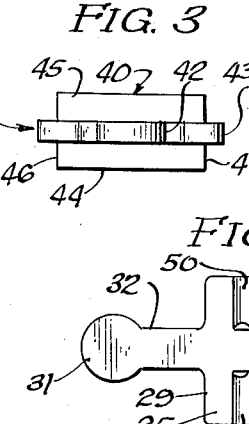
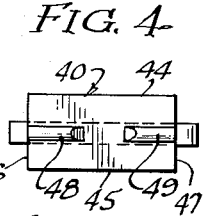
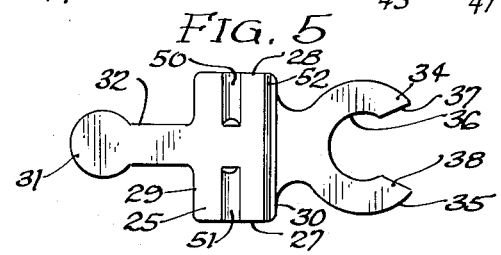
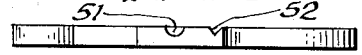
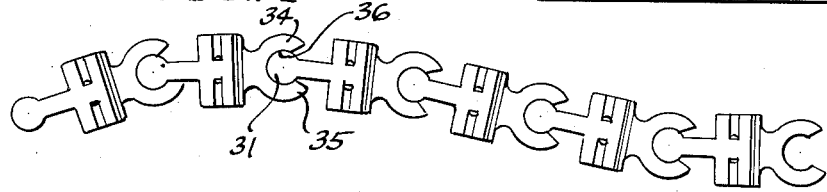
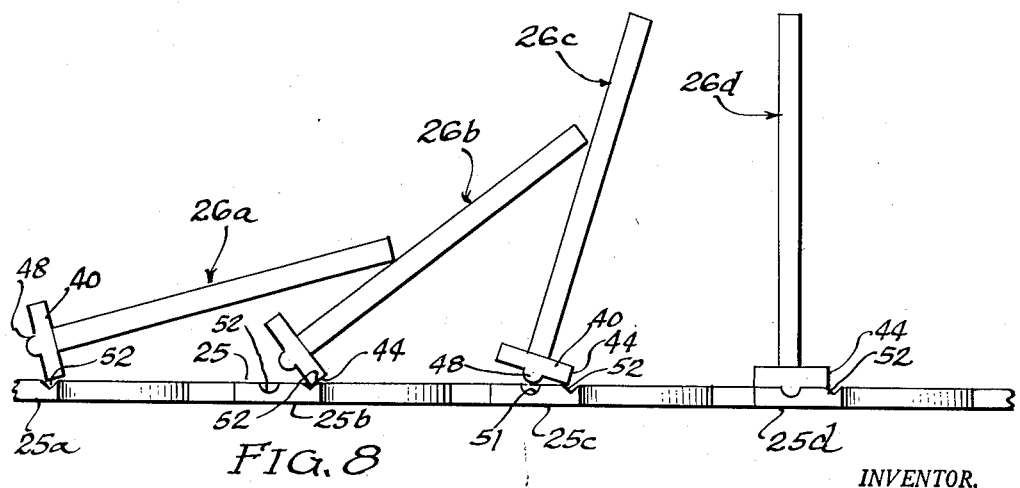
INVENTOR.
Eric Glaser
BY Charles P. Vojtech
Att'y

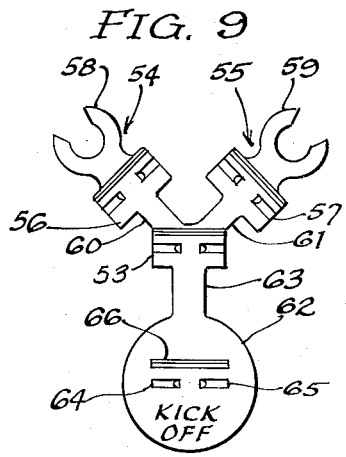
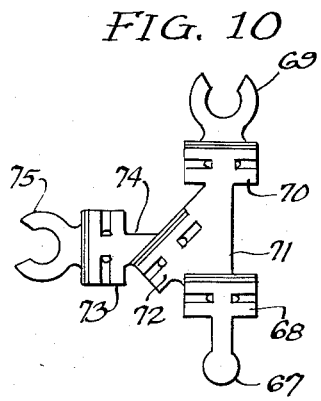
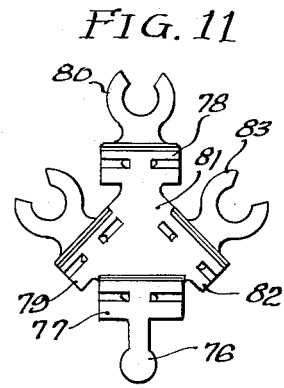
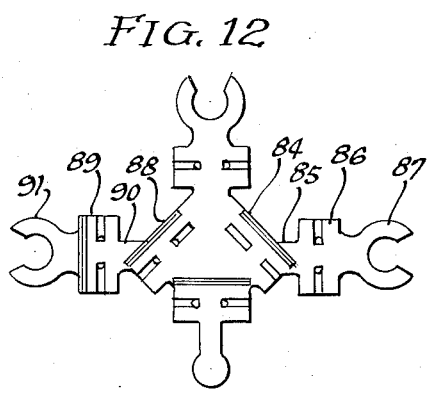
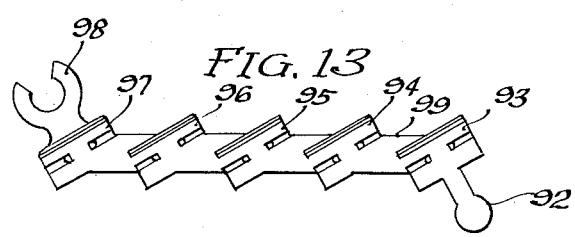
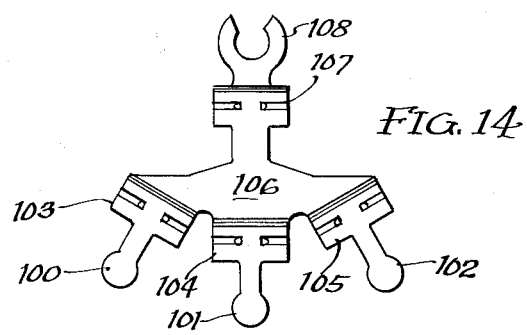
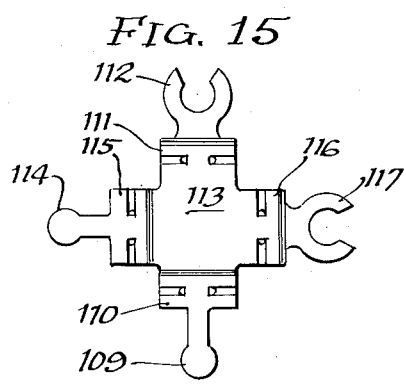
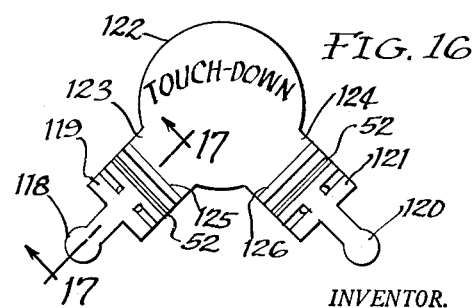
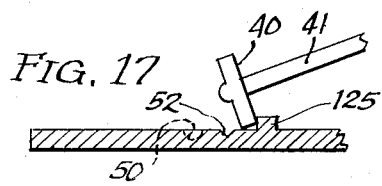

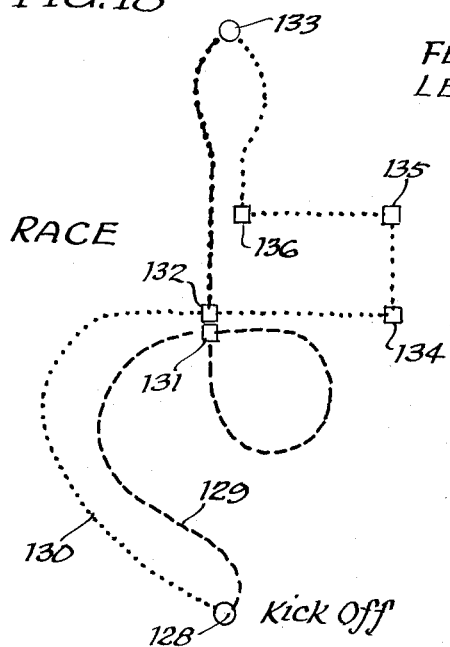
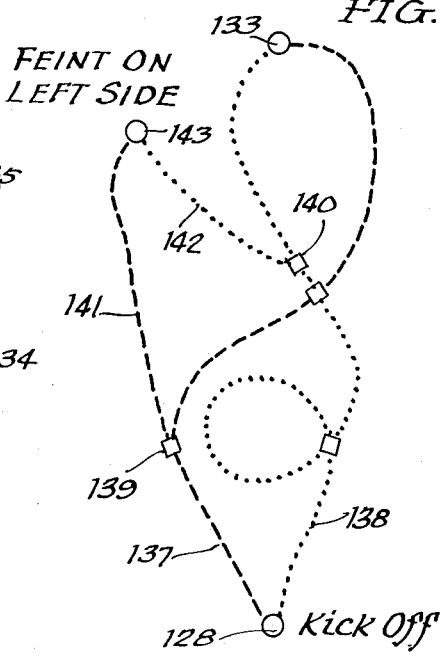
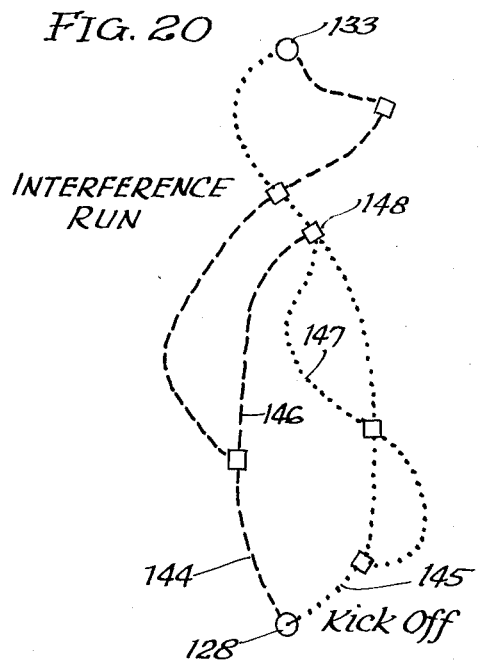
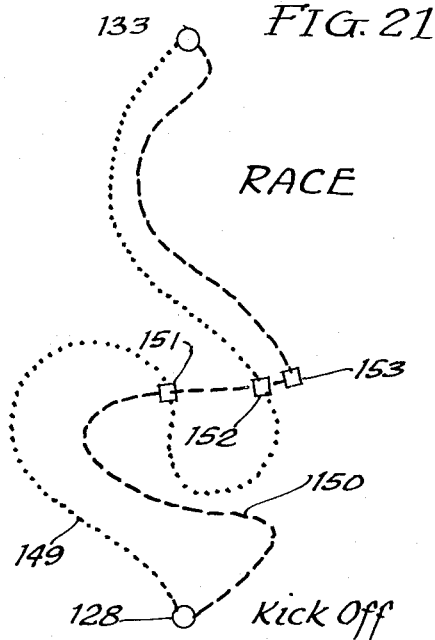

United States Patent Office 2,713,489
Patented July 19, 1955

2,713,489

FALLING MAN CHAIN AMUSEMENT DEVICE

Eric Glaser, Chicago, Ill.

Application May 17, 1954, Serial No. 430,058

9 Claims. (Cl. 273—86)

This invention relates to an amusement device, the principal feature of which involves the erection of figures in the form of chains, the figures subsequently being knocked down sequentially to introduce a time element whereby the device may be adapted for use as a competitive game.

A general object of this invention is the provision of a minimum number of inexpensive basic units in an amusement device from which a plurality of chains of varying form and length can be constructed, the chains being so related that they emanate from a common starting point and converge upon a predetermined end point, with means for permitting the chains to cross one another, or to provide branches for the production of secondary or associated activities relative to the main chains.

A more specific object of this invention is the provision as an amusement device of basic chain units having a limited swiveling action in the same plane, each unit being adapted to support a figure of predetermined height and width, the figures being so arranged and proportioned that when one is made to fall toward the adjacent figure, it will contact such adjacent figure and cause it likewise to fall against an adjacent figure, the falling action progressing from figure to figure in continuous succession.

As a still more specific object, this invention seeks to provide a basic unit for a chain toy or game wherein said unit is adapted to support a figure to be subsequently knocked down as the game proceeds, with means for locating the figure over a predetermined portion of the unit, and additional means for controlling the manner in which the figure falls.

As another specific object, this invention seeks to provide a toy or game made from a series of basic chain units which are adapted to support a figure placed thereon, with special units interposed in the chain of basic units adapted to serve as starting points for branch chains and with means on said special units for converting a forward falling movement of a figure mounted thereon to a movement of the figures in the branch line in the direction of said branch line.

Another specific object of this invention is to provide, in an amusement device having basic units adapted to support a figure for forward falling movement, means for establishing a plurality of chains emanating from a common point, and means for converging said chains back into a single chain, said converging means being adapted to convert the forward falling movement of the figures therein to a forward falling movement of the figures in the chain emanating from the converging point.

These and other objects of this invention will become apparent from the following detailed description when taken together with the accompanying drawings in which:

Figs. 1 and 2 are front and side elevations respectively of a basic figure which may be used with the herein described amusement device;

Figs. 3 and 4 are respectively top and bottom views of the figure of Fig. 1;

Figs. 5 and 6 are plan and side elevational views, respectively, of a basic link unit used in the device of this invention;

Fig. 7 is a plan view of a plurality of links of the types shown in Figs. 5 and 6 connected together in series and showing the flexibility of the chain so formed;

Fig. 8 is a side elevational view, of an assembled chain and figures mounted thereon showing the relation between the figures as they fall forward;

Figs. 9 to 16 inclusive show various forms of special chain units;

Fig. 17 is an enlarged fragmentary side elevational view of a modification of the basic chain unit which is used at the terminus of the chain to prevent forward sliding of a figure; and Figs. 18 to 21 inclusive are schematic diagrams of a few of the forms which the chains of this invention may take.

For purposes of illustration this invention will be described with reference to its use as a game, that is, as a means for staging a contest, since its versatility is most apparent when it is so used. It is understood, however, that the elements thereof may be used as toys if so desired.

The basic units of the chain are the links shown in Figs. 5 and 6 and the figures shown in Figs. 1 to 4, inclusive. Referring first to Figs. 5 and 6, each link is comprised of a body member 25 which, in the form chosen for illustrative purposes, is of substantially rectangular shape, with the small sides 27, 28 disposed parallel to the general axis of the link and the long sides 29 and 30 disposed transversely to said axis.

The left-hand portion of the link as shown in Fig. 5 is considered the rear portion thereof and is comprised of a circular knuckle or male portion 31 joined to side 29 of the bodies 25 by a parallel sided neck 32. The forward portion of the link is comprised of a pair of jaws 34, 35 defining an interrupted circular opening 36 the diameter of which is just slightly larger than the diameter of the knuckle 31 so that said knuckle 31 of an adjacent link may be received snugly within the opening 36. The open ends 37 and 38 of the jaws may be straight and inclined relative to a radius of opening 36 such that the narrowest portion of the opening defined by said ends is greater than the transverse dimension of neck 32, but is less than the diameter of knuckle 31. Such arrangement of the ends 37, 38 allows jaws 34, 35 to rotate through a limited angle relative to a knuckle 31 received therein and hence permits a chain made of such links to be bent or curved in an interesting fashion.

Each link is designed to support a figure similar to the one shown in Figs. 1 to 4 inclusive. Each such figure is comprised of an upright portion 39 and a base 40, the latter preferably being made as an integral part of the upright portion 39. Said upright portion 39 may be made from a relatively flat strip of material the edges of which are contoured in any desirable manner to represent the figure to be used in the game. The contour, however, is symmetrical with respect to the vertical axis of the figure for reasons which will be made apparent hereinafter. For purposes of illustration, the figure shown herein is that of a football player having a body 41, a head 42 and shoulders 43. The base 40 is preferably rectangular in plan view and has parallel front and back surfaces 44 and 45, respectively, and substantially parallel sides 46 and 47. The dimension of the base from side to side is substantially equal to the dimension of the link from side 27 to side 28 thereof, but the dimension from front to rear of base 40 is preferably made somewhat less than the dimension from long side 29 to long side 30 of the link. It is understood that these dimensions may vary in accordance with the figure chosen, but for reasons which will be made apparent hereinafter, it is desirable that the front surface 44 be disposed slightly within the long side 30 of the link.

The height of the figure is related to the spacing between corresponding portions of the links in such manner that a figure on one link falling forward will strike the figure on the next link in a forward direction before the first figure falls completely. Thus the height of a figure should be greater than the distance between adjacent figures or between corresponding parts of adjacent links.

Each figure 26 may be supported on a link by placing the rectangular base 40 of the figure upon the correspondingly rectangular body 25 of the link. It is desirable for smooth continuity of action that each figure be supported at precisely the same place and in precisely the same way on each link and hence means are provided for insuring such location of a figure on a link with the exercise of a minimum amount of care and attention on the part of a player. Thus, the base 40 of each figure is provided with a pair of spaced lugs 48, 49 on the underside thereof which are adapted to be received in correspondingly shaped and spaced recesses 50 and 51 in the upper surface of the body 25 of a link. Recesses 50 and 51 are disposed slightly to the rear of the center of the body 25 and lugs 48 and 49 are disposed substantially on the transverse axis of rectangular base 40 so that when a figure is placed on a link, the forward surface 44 of base 40 will be located a slight distance to the rear of the long side 30 of body 25 as aforesaid. A transverse groove 52 is formed in the upper surface of body 25 and is located adjacent front surface 44 of base 40, the corner formed by the front surface 44 and the bottom of base 40 slightly overhanging the rear portion of the groove. Thus if a figure is properly placed upon a link and is then made to fall forward, the lower front corner of the base will fall into the adjacent groove 52 and the falling figure will then swing around the lower front corner of the base without sliding forward on the link, thus resulting in a controlled fall of the figure. This controlled fall makes it possible to predict both the manner and the direction in which a figure will fall so that various branching, sidewise moving and converging movements of a chain of figures can be effected.

It is contemplated that the chain will be arranged or laid out first and that the figures will then be applied to the chain, although it is not absolutely necessary that this order be followed in each instance. Thus a plurality of links may be arranged in the fashion shown in Fig. 7 wherein a knuckle 31 of one link is shown received within the circular portion 36 of the jaws 34, 35 of the immediately adjacent link. The insertion of a knuckle into a circular opening 36 may be readily accomplished by placing one over the other and allowing the two to assume the same plane. When the links are so arranged, they cannot be pulled apart by relative movement in the direction of their fore-and-aft axes. The amount of angular movement of one link relative to an adjacent link permitted by the construction of the links shown in Figs. 5 and 6 is illustrated in Fig. 7 wherein the first and second links from the left show substantially the maximum angularity available, and the remaining links show various lesser amounts of angularity in the same and opposite directions.

The manner in which the figures are set up on the links and their behavior as they fall are illustrated in Fig. 8. Four figures 26a, 26b, 26c and 26d are shown in various attitudes relative to their links 25a, 25b, 25c and 25d. Figure 26d is shown in an upright position, and figure 26c is shown as it begins to tip forwardly, with the lower front corner of the base 40 thereof beginning to enter groove 52, and with lug 48 substantially raised out of its locating recess 51. Figure 26c under these conditions may slide forwardly until the said lower front corner strikes the forward wall of groove 52, whereupon further forward movement of base 40 is prevented. Figure 26b is shown fallen forwardly approximately 45°, and it will be apparent that said figure 26b in falling forwardly simply pivots in groove 52 about the lower front corner of its base 40 so that there is little or no movement of translation in a forward direction of figure 26b relative to its link. Figure 26a is shown in an almost horizontal position and its forward movement, or tendency toward such movement, has practically ceased. Furthermore, the slope of figure 26b is such as to resist forward movement of figure 26a, and hence, even though the effectiveness of groove 52 as a means for holding the lower forward corner of the base of that figure against forward movement has practically ceased due to the fact that said lower forward corner is moving out of the groove, no undesired forward movement will ensue.

Various special forms of links are shown in Figs. 9 to 16 inclusive. These forms may be combined with the Fig. 5 form of link and with one another to establish chains of different configurations and relationship to one another to amuse a player. Several chains may be made to emanate from, or converge upon, a common point and to cross one another. Where it is desired to cause the chain to pass around an obstacle which is so disposed relative to the chain as to require a curvature thereof exceeding that available in the knuckle and jaw coupling, the special link shown in Fig. 13 may be used.

It may be appreciated that since all of the special links are designed to support and cooperate with identical figures and with the Fig. 5 form of link, such links will have parts which are duplicates of corresponding parts of the Fig. 5 form of links. To avoid unnecessary repetition, therefore, corresponding parts of the special links will be given the same reference characters or designations, it being understood that the structure within a part has the same construction and function as the structure of a part having the same designation.

Referring again to Fig. 5, the basic elements of the link which may find counterparts in the special links of Figs. 9 to 16 inclusive are the body 25 which is a rectangular portion of material having figure-locating recesses 50 and 51, and a transverse groove 52 shaped and arranged relative to the axis of the link in the manner shown in this figure; a knuckle 31 comprising the cylindrical rear terminus of the link and a neck 32 which connects it with body 25; and jaws which includes all of the link to the right of the body 25 of Fig. 5.

Referring now to Fig. 9, the special form shown therein is intended to be used to start two chains of figures falling simultaneously, the start being made in a manner which will reduce or eliminate human error in the timing. It is comprised of a common body 53 from which diverge two branches 54, 55, each branch including a body 56, 57, respectively, and jaws 58, 59. The axes of the branches may be designed to diverge at an angle of 90° from one another, the angle being varied within the physical limitations imposed by the configuration and size of the bodies 56, 57. The angular disposition of bodies 56, 57 relative to body 53 is precisely the same. The branches 54, 55 have necks 60 and 61 which connect the rearward regions of bodies 56 and 57 to the forward part of body 53, the lengths of the said necks 60 and 61 being so chosen that when a figure mounted on body 53 falls forward, i. e. toward the space between the branches 54, 55, it will strike the right side of the back of the figure mounted on body 56 and the left side of the back of the figure mounted on body 57.

It may be noted from Fig. 1 that the external contour of the figure is symmetrical with respect to a vertical line drawn through the figure and bisecting base 40. This symmetry makes it possible for a figure falling from body 53 to strike opposite sides of the backs of figures on the branch bodies 56, 57 and yet strike them at precisely the same instant, assuming, of course, that the first-mentioned figure is not influenced by a player toward one or the other of the figures as it is struck to make it fall.

To eliminate any possibility of human error in causing the figure on body 53 to fall forward, the link shown in Fig. 9 is formed with a disc 62 spaced rearwardly of body 53 and connected thereto by a neck 63. Disc 62 is formed with spaced recesses 64, 65 which are identical with recesses 50, 51 of Fig. 5, and with a transverse groove 66 which is identical in contour and disposition relative to recesses 64 and 65 with groove 52 of Fig. 5. Furthermore, groove 66 is disposed parallel with the corresponding groove in body 53. Thus, disc 62 is a figure-supporting body such as bodies 53, 56 and 57, and groove 66 is located behind body 53 a distance which is less than the height of a figure, and preferably the same distance apart as are located corresponding parts of connected links in a chain such as in Fig. 7.

It may be apparent that a starting figure mounted on body 53 can be made to fall by causing a figure mounted behind it over recesses 64, 65 to fall forward, and that due to the controlling influence of transverse groove 66, the direction of fall of the latter figure will be along the fore-and-aft axis of the body 53, and the falling figure will strike the center of the figure on body 53. The latter figure is thus set in motion without being touched by a player and hence a simultaneous and uniform start of the figures in the branches 54, 55 is assured.

Fig. 10 shows a link which may be interposed in a chain in place of two regular links. Its function is to establish a connection for a branch chain which leaves the parent chain at an angle of 90°. It is comprised of a knuckle 67, and attached body 68, jaws 69 and attached body 70, and a connecting web 71, bodies 68 and 70 being aligned and spaced apart a distance equal to the distance between adjacent bodies in a chain. A body 72 is formed integrally with web 71 and with its fore-and-aft axis disposed substantially at 45° with the axis of bodies 68, 70. The distance between bodies 68 and 72 is such that a figure falling forward from body 68 will strike the back of a figure mounted on body 72. A fourth body 73 is secured to the forward part of body 72 by a neck 74, said body 73 having jaws 75 secured to the forward part thereof. Body 73 is disposed with its fore-and-aft axis at an angle of 45° to the axis of body 72 and at an angle of 90° to the fore-and-aft axis of body 68. The distance between bodies 72 and 73 is again such that a figure falling forward from body 72 will strike the back of a figure mounted on body 73 and thus set in motion the figures on the links connected to jaws 75.

In the Fig. 10 form of link, a figure falling forward on body 68 will strike a figure mounted on body 72, and will continue falling forward to strike a figure mounted on body 70. It will not be materially deflected from its forward fall because of the controlling effect imposed on its motion by the transverse groove in body 68. The falling figure on body 72 will strike a figure on body 73 as aforesaid to continue the falling movement in the branch chain connected thereto.

The link shown in Fig. 11 is designed to establish two branches, one on each side of a chain, and both disposed at 45° to the fore-and-aft axis of the link. It includes a knuckle 76, bodies 77, 78, 79 and 82 and jaws 80 all of which are disposed relative to one another in precisely the same way and at the same distances from one another as the corresponding knuckle 67, bodies 68, 70 and 72 and jaws 69 of the link of Fig. 10. The connection between bodies 77, 78 and 79 is effected by a web 81. On the side of the fore-and-aft axis of the link opposite body 79 is a fourth body 82 which is symmetrically disposed with respect to said axis relative to body 79, said body 82 having jaws 83 extending from the forward side thereof. Body 82 is likewise connected to the remaining parts of the link by web 81. The action of figures mounted on the several bodies in this link is identical to that of the figures on bodies 68, 70 and 72 of the Fig. 10 link, with the action of the figure on body 82 corresponding to the action of the figure on body 79 and occurring simultaneously therewith, due to the symmetry of the arrangement.

Where two branches at 90° from the fore-and-aft axis of the link are desired, the link shown in Fig. 12 may be used. In this link, a body 84 disposed at an angle of 45° with respect to the fore-and-aft axis of the link, a neck 85, a body 86, and jaws 87 are arranged on the right-hand side of the said fore-and-aft axis symmetrically with respect to the corresponding bodies 88, 89, neck 90 and jaws 91 on the left-hand side thereof. Thus the Fig. 12 link is identical with the Fig. 10 link except that the right-hand side thereof has been made identical with the left-hand side. The action of figures mounted on the Fig 12 link is likewise identical with the action of figures mounted on the Fig. 10 link, with the additional action of causing figures mounted on bodies 84 and 86 to fall, the latter falling in a direction opposite to that of the figure mounted on body 89.

The link shown in Fig. 13 is designed to shift a chain laterally more sharply than the Fig. 5 links would permit it to be shifted by a mere swinging of the jaws of the links about their interengaging knuckles in a double reverse bend. The Fig. 13 link is comprised of a knuckle 92 joined to the first body 93 of a plurality of bodies 94, 95, 96, 97, the last of which being joined to jaws 98. The bodies are connected to one another by webs 99. The fore-and-aft axes of the bodies 93—97 are parallel with one another and the lateral displacement of one body relative to the next is such that a forwardly falling figure on one will strike some portion of the back of the adjacent figure. Obviously, the bodies can be arranged to shift the action to the right of body 93, or to the right of any of the intermediate bodies, and the number of bodies in the link can be increased or decreased as desired, thereby making possible an almost infinite number of designs of sidewise movements.

The versatility of the herein described chain toy is such that it is possible to cause several chains to converge upon a single chain. Such a converging link is shown in Fig. 14 wherein three knuckles 100, 101, 102 representing the end points of three chains are connected to three bodies 103, 104, 105 which, in turn, are connected by a web 106 to a body 107 having jaws 108 formed on the forward side thereof. If desired, two bodies such as 104 and 107 may be aligned and the other bodies may be disposed at an angle with respect to the fore-and-aft axis of the aligned bodies. It may be apparent that the angular disposition of the bodies relative to one another may vary within wide limits, so long as the figures falling forwardly will strike the back of a figure mounted on body 107. The spacing between body 107 and the remaining bodies 103, 104, 105 is, of course, less than the vertical dimension of a figure so that the figure on body 107 will always be contacted by one or the other of the falling figures on the remaining bodies.

The converging link of Fig. 14 can be modified to have just two chains to converge instead of the three shown, and the two may be arranged at any angle with respect to one another and to the body 107 subject to the limitation expressed above.

Where it is desired to have one chain cross another, the link shown in Fig. 15 may be used. This link is comprised of a knuckle 109 and connected body 110 aligned with a body 111 and connected jaws 112, with a web 113 connecting the bodies 110, 111. A similar knuckle 114 and connected body 115 aligned with a body 116 and connected jaws 117 are disposed with their fore-and-aft axes at whatever angle the crossover is designed to make with the fore-and-aft axis of knuckle 109, bodies 110, 111, and jaws 112. In the form illustrated in Fig. 15, the angle is 90°, but it is understood that the angle can be varied. The spacing between aligned bodies 110, 111, and 115, 116 is substantially the same as the spacing between bodies of adjacent links. With figures mounted on the bodies 110, 111, 115 and 116, the forward fall of a figure on body 110 will not disturb either of the figures on bodies 115 and 116, and will merely serve to continue the falling movement of a chain incorporating bodies 110 and 111. The same would, of course, be true of a figure falling forward on body 115.

The chains may be conveniently terminated in a special converging link which may be termed a "goal." If the chains are used in a competitive game, the figure first to fall on a common point on the converging link can be declared the winner of the game. Such special terminal link is shown in Figs. 16 and 17 to which reference is now made. The link therein depicted is comprised of a knuckle 118 forming part of one chain, and a body 119 connected thereto, and a knuckle 120 forming part of another chain, and connected body 121. Bodies 119 and 121 are connected to arms 123, 124, respectively, extending angularly from a disc 122, said disc, if desired, being embossed with, or otherwise bearing, indicia suitable to the game being played.

Inasmuch as the link depicted in Fig. 16 is the last in a chain, the figures falling from bodies 119 and 121 do not have other figures in front of them to arrest their forward movement. Consequently, means are provided on arms 123, 124 to perform an arresting function upon the figure mounted on bodies 119, 121. Such arresting means may be abutments in the form of small flanges or beads 125 and 126 extending upwardly from the top surface of arms 123, 124, respectively, across said arms, and parallel with and spaced a short distance from grooves 52 on bodies 119 and 121. As a figure mounted on body 119 for example falls forward, its base 40 first enters and pivots in groove 52 and then when the angle of the figure to the horizontal decreases to the point where the restraining influence of groove 52 has substantially disappeared, the base 40 will slide forward until it engages flange 125, whereupon its forward movement will cease. Thus, the fallen figure remains on disc 122 where it can be examined and the results of the contest can be readily determined.

A few of the many forms which the chains of this invention may take are shown schematically in Figs. 18 to 21. To distinguish between the chains, the figures or the links, or both, in one chain may be colored differently from those of the other chain, or the figures in one chain may represent one character and those in the other chain a different character. It is obvious that many ways of distinguishing between chains will suggest themselves to those skilled in the art.

In Fig. 18, the chain represented by dots 130 may be colored red and the one represented by dashes 129 may be colored blue. Both chains start from a link 128 which may be like the one shown in Fig. 9. Chain 129 may have an S-curve with a cross-over link 131 therein similar to the link shown in Fig. 15 so that it may circle clockwise and cross over itself and then, by means of a similar cross-over link 132, cross chain 130 and proceed via a shallow S-curve to a terminal link 133 resembling the one depicted in Figs. 16 and 17. Chain 130 may proceed from starting link 128 and curve to the right over cross-over link 132 to a single left-hand branch link 134. From link 134 it proceeds to another single left-hand branch link 135, then to a single right-hand branch link 136 and via a shallow S-curve to terminal link 133.

The chains 137, 138 in Fig. 19 utilize the same links as chains 129, 130 but arranged differently and incorporating 45° branch links 139, 140 similar to the one depicted in Fig. 11 to establish additional chains 141, 142 which meet in a secondary terminal link 143. The chains 144, 145 of Fig. 20 differ from the chains 137, 138 of Fig. 19 mainly in that the branch chains 146, 147 of the former converge upon chain 145 through the use of a converging link 148 which is similar to the link of Fig. 14.

The chains 149, 150 show another arrangement of links including cross-over links 151, 152 and side branch link 153.

The chain arrangements of Figs. 18 and 21 may be utilized to stage races between figures mounted on each chain, the figure first to fall on the terminal link 133 being the winner. The chain arrangement of Fig. 19 may be used to show a diversionary activity to the left of each principal chain, and the arrangement of Fig. 20 may be used to interpose some interference in the chain 145. The latter two arrangements may be made to simulate plays in a football game and hence the chains of this invention, in addition to serving as toys or amusement devices, may be used by a football coach to illustrate plays in a football game.

The shapes of the links and figures are such that they can be readily molded from any of the well-known plastic materials with the use of relatively simple molds. Various colors can be molded into the links for durability and for differentiating between figures or links. The starting and finishing links can be made white or black to indicate their neutral character.

It is understood that the foregoing description is merely illustrative of preferred embodiments of this invention and that the scope of the invention therefore is not to be limited thereto, but is to be determined by the appended claims.

I claim:

1. An amusement device comprising a plurality of connectable links, each having a cylindrical element at one end, a jaw at the other end to which the cylindrical element of the adjacent link can be coupled for swivelling movement therearound, a central section, and a figure adapted to be supported by the central section in a manner enabling said figure to fall forward, said figure having a straight transverse forward edge at the base thereof, said central section having a transverse groove to receive the said transverse forward edge when said figure falls forwardly whereby to control the direction and position of the falling figure, and means for locating the figure on the central section with the said forward edge disposed over and aligned with the said groove.

2. An amusement device as described in claim 1, said locating means comprising spaced depressions on the central section and corresponding spaced projections on the base of the figure adapted to be received in the depressions.

3. An amusement device comprising a plurality of connectable links, each having a cylindrical element at one end, a jaw at the other end to which the cylindrical element of the adjacent link can be coupled for swivelling movement therearound, a central section, and a figure adapted to be supported by the central section in a manner enabling said figure to fall forward, said link being arranged in two chains, a link common to the two chains, and a figure adapted to be supported by the common link in a manner enabling said figure to fall forward to strike simultaneously the figures on the links immediately adjacent the common link.

4. An amusement device comprising a plurality of connectable links, each having a cylindrical element at one end, a jaw at the other end to which the cylindrical element of the adjacent link can be coupled for swivelling movement therearound, a central section, and a figure adapted to be supported by the central section in a manner enabling said figure to fall forward, said links being arranged in two chains, and a link in one chain connected to the other chain, said connecting link having a cylindrical element at one end, a relatively long central section, a branch extending from the said relatively long central section and constituting the connection to the other chain, said last-mentioned link being adapted to support two figures arranged in spaced relation in one chain, and to support an intermediate figure between the two figures and which intermediate figure is adapted to fall between the two chains, and a fourth figure in the second chain, said intermediate figure being adapted to be struck by one of the spaced figures and to strike the fourth figure as said intermediate figure falls forward.

5. An amusement device comprising a plurality of connectable links, each having a cylindrical element at one end, a jaw at the other end to which the cylindrical element of the adjacent link can be coupled for swivelling movement therearound, a central section, and a tall figure having a short base adapted to be supported by the central section in a manner enabling said figure to fall forward, and a terminal link having a jaw adapted to be coupled to the cylindrical element of the adjacent link, a figure-supporting body aligned with the jaw of the terminal link, a groove on the body cooperable with the base of a figure for controlling the direction of fall of a figure mounted on the body, and an abutment on the body adapted to be contacted by the base of a falling figure and limiting the forward movement of the figure relative to the base.

6. An amusement device as described in claim 5, said abutment comprising a bead on the terminal link disposed forwardly of and substantially parallel with the groove.

7. An amusement device comprising a plurality of connectable links, each having a cylindrical element at one end, a jaw at the other end to which the cylindrical element of the adjacent link can be coupled for swivelling movement therearound, a central section, and a figure adapted to be supported by the central section in a manner enabling said figure to fall forward, said links being arranged in two chains, a link common to the two chains and having a pair of cylindrical sections, one connected to each chain, a pair of figure supporting bodies each connected to and aligned with one of said pair of cylindrical sections, and means on the pair of figure-supporting bodies extending into the path of movement of a figure falling from said pair of figure supporting bodies to arrest the forward component of movement of said falling figure.

8. An amusement device as described in claim 7, the figures each having a base formed with a forward section having substantially parallel top and bottom surfaces, and the means comprising an abutment extending above the surface of the figure-supporting bodies and spaced forwardly of the forward section of the base, whereby when a figure mounted on one of said bodies falls forward, the top surface of the base thereof strikes the abutment and the forward movement thereof is arrested as aforesaid.

9. An amusement device comprising a plurality of connectable links, each having a cylindrical element at one end, a jaw at the other end to which the cylindrical element of the adjacent link can be coupled for swivelling movement therearound, a central section and a relatively tall figure having a short flat base adapted to be supported by the central section in a manner enabling the figure to fall forward, the figure on one link falling forward and striking the figure on the adjacent connected link in succession, and means for shifting the direction of the falling figures laterally beyond the normal limits of the swivelling action of the coupled jaw and cylindrical element, said means comprising a link having a cylindrical element at one end, a jaw at the other end, and a plurality of figure-supporting sections connected therebetween, said sections being disposed with corresponding axes thereof parallel with one another and laterally displaced a distance less than the width of a figure.

References Cited in the file of this patent

UNITED STATES PATENTS

| | | |
|---|---|---|
| 286,379 | Bogia | Oct. 9, 1883 |
| 1,246,796 | Stanger | Nov. 13, 1917 |